United States Patent
Nishihata et al.

(10) Patent No.: US 7,061,208 B2
(45) Date of Patent: Jun. 13, 2006

(54) STORAGE BATTERY TEMPERATURE REGULATOR HAVING THERMOELECTRIC TRANSDUCER, AND VEHICLE INCLUDING THE STORAGE BATTERY TEMPERATURE REGULATOR

(75) Inventors: Hideo Nishihata, Shiga (JP); Osao Kido, Kyoto (JP)

(73) Assignee: Matsushita Refrigeration Company, Shiga (JP)

( * ) Notice: Subject to any disclaimer, the term of this patent is extended or adjusted under 35 U.S.C. 154(b) by 226 days.

(21) Appl. No.: 10/477,899

(22) PCT Filed: Jun. 24, 2002

(86) PCT No.: PCT/JP02/06303

§ 371 (c)(1),
(2), (4) Date: Nov. 19, 2003

(87) PCT Pub. No.: WO03/001313

PCT Pub. Date: Jan. 3, 2003

(65) Prior Publication Data

US 2004/0135550 A1    Jul. 15, 2004

(30) Foreign Application Priority Data

Jun. 25, 2001    (JP) .............................. 2001-190918

(51) Int. Cl.
*H01M 10/46* (2006.01)
(52) U.S. Cl. ..................................................... 320/150
(58) Field of Classification Search ................ 320/107, 320/112, 150
See application file for complete search history.

(56) References Cited

U.S. PATENT DOCUMENTS

| | | | |
|---|---|---|---|
| 4,229,687 A * | 10/1980 | Newman | ................. 320/112 |
| 5,269,146 A | 12/1993 | Kerner | |
| 5,901,572 A | 5/1999 | Peiffer et al. | |
| 5,987,890 A | 11/1999 | Chiu et al. | |
| 6,038,865 A | 3/2000 | Watanabe et al. | |
| 2001/0040061 A1 | 11/2001 | Matuda et al | |

FOREIGN PATENT DOCUMENTS

| | | |
|---|---|---|
| CN | 1119731 | 4/1996 |
| CN | 1278113 | 12/2000 |
| DE | 40 17 475 | 12/1991 |
| EP | 0 278 884 | 8/1988 |
| EP | 0 819 898 | 1/1998 |
| JP | 8-148189 | 6/1996 |
| JP | 9-289701 | 11/1997 |
| JP | 10-270095 | 10/1998 |
| JP | 11-55869 | 2/1999 |
| JP | 11-176487 | 7/1999 |

OTHER PUBLICATIONS

US 5,706,890, 01/1998, Sloan et al. (withdrawn)

* cited by examiner

*Primary Examiner*—Edward H. Tso
(74) *Attorney, Agent, or Firm*—Wenderoth, Lind & Ponack, L.L.P.

(57) ABSTRACT

A temperature regulator efficiently regulates a temperature of a storage battery. The regulator includes a thermoelectric transducer having a first face and a second face. The first face is thermally coupled with one or plural storage batteries, and the second face is thermally coupled with a thermal action accelerating medium that accelerates thermal action on the second face. The first face and the second face do two jobs contradictory to each other, i.e., heat dissipation and heat absorption, responsive to a polarity in exciting the battery. This structure allows the temperature regulator to cool down and warm up the storage battery.

25 Claims, 7 Drawing Sheets

STORAGE BATTERY TEMPERATURE REGULATOR HAVING THERMOELECTRIC TRANSDUCER, AND VEHICLE INCLUDING THE STORAGE BATTERY TEMPERATURE REGULATOR

TECHNICAL FIELD

The present invention relates to a temperature regulator of a storage battery and a vehicle including the same temperature regulator. More particularly it relates to a temperature regulator of a storage battery suitable for vehicles such as an electric car and a hybrid car, and also relates to a vehicle including the same temperature regulator.

BACKGROUND ART

Electric cars and hybrid cars have been commercialized, in which a drive-motor and a storage battery for driving the drive-motor are mounted to those cars. The hybrid car, in particular, fits modern life and draws market attention.

FIG. 8 shows a driving system of a hybrid car available in the market. An engine, a drive-generator and an air-conditioning compressor are mounted in the car. The engine drives both of the compressor and drive-wheels. A control system includes a control unit (ECU), a DC/DC converter and an inverter. A storage battery of 36V is mounted for driving the drive-generator, and a storage battery of 12V is mounted for driving the control system and a starter. Both of the storage batteries are of the same size and mounted in a trunk (boot). The generator generates electricity and charges both the batteries while the car runs, i.e., prepares for further use, namely, discharging. When the 36V storage battery drives the generator, a transmission of the engine is set at a neutral position.

Meanwhile, cars employed storage batteries of 6V at first, which were replaced by 12V batteries, and now are going to be replaced by 42V batteries that guarantee 36V as discussed above. The battery drives not only a generator but also an air-conditioning compressor, and further use of storage batteries can be expected.

The storage battery, as discussed above, is charged while the engine is driven, so that it can be used as long as possible. However, self-heating of the battery shortens its expected service-life. The self-heating is generated by a chemical reaction in charging and discharging. When a temperature rises, dilute sulfuric acid gas runs away, which erodes the electrodes, so that the service life of the battery is shortened. The battery sometimes discharges several kilowatts at 36V, namely, 200–250A. Thus, if a temperature of the battery rises by more than 10° C. from an operating temperature ranging from 50 to 60° C., the service life is reduced by half.

In order to overcome such a problem, Japanese Patent Application Non-Examined Publication No. H09-289701 discloses that a lithium-ion battery employs a method of reducing discharging-power step by step in two steps.

In the case of a lead-acid battery, charge/discharge is controlled so that off-charge and off-discharge can be done in two steps within a temperature-range from 60 to 70° C. for overcoming the problem discussed above. Charge/discharge is desirably thus controlled in an early stage; otherwise, a thermal runaway occurs and a temperature of the battery rises instantaneously to as high as 80–90° C.

In the case of a nickel metal hydride battery, Japanese Patent Application Non-Examined Publication No. H10-270095 discloses an air-cooling apparatus including a fan, for instance. Various methods of providing an air-cooling path are proposed in order to cool the battery effectively.

However, those discharge restricting methods discussed above force the users to use the battery only for a short period due to the temperature rise of the battery, and the battery needs a long time for recovery. Thus a hybrid car employing one of those methods cannot fully enjoy the advantages of the hybrid. In other words, the car runs with gasoline rather than with the batteries. Thus it is desired to increase the ratio of battery-driving vs. gasoline-driving.

In the case of air-cooling used with the nickel metal hydride battery, the battery is still protectively controlled, and the cooling effect needs improvement for increasing the ratio of battery-driving.

The lead-acid battery functions even at a temperature ranging from as low as −5 to −30° C., although its performance lowers by 20–30%. On the other hand, the nickel metal hydride battery and the lithium-ion battery cannot work properly at a low temperature, thus they need to be warmed up. However, conventional temperature regulating techniques for warming up cannot deal with severe low temperatures in cold areas.

SUMMARY OF THE INVENTION

A temperature regulator that regulates a temperature of a storage battery includes a thermoelectric transducer such as a thermoelectric module or a thermoelectric chip that has the same characteristics as the thermoelectric transducer. The transducer does two jobs contradictory to each other, i.e., dissipating and absorbing heat using its first and second faces responsive to a polarity in exciting the battery. The first face is thermally coupled with the storage battery, and the second face is thermally coupled with a thermal-action accelerating medium which accelerates a thermal action on the second face.

DETAILED DESCRIPTION OF PREFERRED EMBODIMENTS

Figure 1:
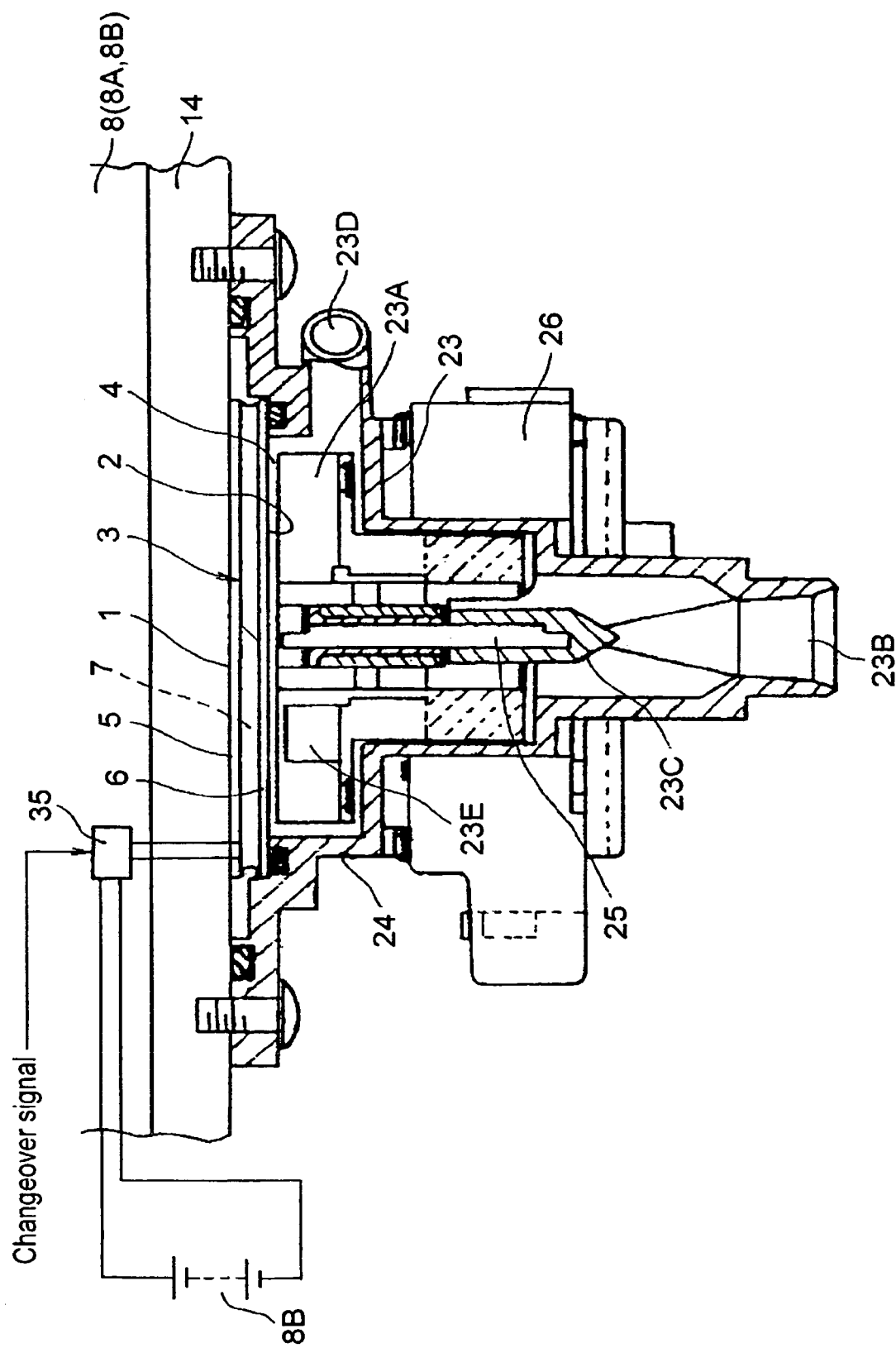
FIG. 1 is a sectional view of a thermoelectric transducer of a temperature regulator coupled to a storage battery in accordance with all the exemplary embodiments of the present invention.

Exemplary embodiments of the present invention are demonstrated with reference to the accompanying drawings.

Elements similar to those in the respective embodiments have the same reference marks.

Exemplary Embodiment 1

A temperature regulator of a storage battery in accordance with the first embodiment includes thermoelectric transducer 3 that does two jobs contradictory to each other, i.e., dissipating and absorbing heat using its first face 1 and second face 2. In this first embodiment, thermoelectric module 7 is used in thermoelectric transducer 3, and employs a Peltier element. In the Peltier element, P-type semiconductors and N-type semiconductors are thermally arranged in parallel, but electrically connected in series. When a current runs through the Peltier element, heat-absorption and heat-dissipation occur on the respective faces due to the Peltier effect. This Peltier element is disposed between heat-transferring and insulating plates 5, 6 made of ceramic, and then those elements are sealed and integrated by encapsulating material made of resin. Heat-transferring plates 5 and 6 form first face 1 and second face 2 of thermoelectric module 7.

In order to regulate a temperature of a storage battery, first face 1 of transducer 3 is thermally coupled to a single storage battery 8A or a plurality of storage batteries 8A, 8B, and second face 2 is thermally coupled to thermal-action accelerating medium 4. In this embodiment, storage battery 8A of 36V for driving a driving system of hybrid car 11 and storage battery 8B of 12V for driving a control system are used, and the temperature regulator simultaneously regulates the temperatures of both the batteries. In FIG. 1, first face 1 and second face 2 dissipate and absorb heat respectively responsive to a polarity in exciting battery 8B, so that batteries 8A, 8B and thermal-action accelerating medium 4 are warmed up or cooled down forcibly. Meanwhile, batteries 8A, 8B are represented by battery 8 hereinafter for making the description simple.

This structure allows first face 1 to forcibly cool down battery 8 when a polarity is set for heat absorption, thereby regulating a temperature of battery 8 not to exceed a predetermined temperature. Also this structure allows second face 2 to accelerate heat dissipation between medium 4 and second face 2, thereby enhancing the cooling capacity of face 1 with respect to battery 8. As such, the temperature regulator cools down battery 8 more efficiently and sufficiently than a conventional air cooling method. Thus a ratio of battery-driving vs. gasoline-driving increases, and the battery-driving can be used for longer hours, and yet a service life of battery 8 is prolonged. This is particularly advantageous to battery 8A that outputs a greater power.

On the other hand, first face 1 forcibly warms up battery 8 when a polarity is set for heat dissipation, thereby regulating a temperature of battery 8 not to fall below a predetermined temperature. Also second face 2 accelerates heat adsorption between medium 4 and second face 2, thereby enhancing the warming-up capacity of face 1 with respect to battery 8. As such, the temperature regulator warms up battery 8 more efficiently and sufficiently, so that the temperature regulator can prevent battery 8 from degrading performance in a low temperature environment of a cold area, and prolong the battery-driving hours.

As discussed above, battery 8 and thermoelectric transducer 3 are suitable for hybrid car 11 and an electric car. They can be also employed with a similar advantage in various vehicles that are driven by a motor, and other mobile objects such as airplanes, submarines, and spaceships. The temperature regulator is applicable to storage batteries mounted to objects other than cars and vehicles.

Figure 2:
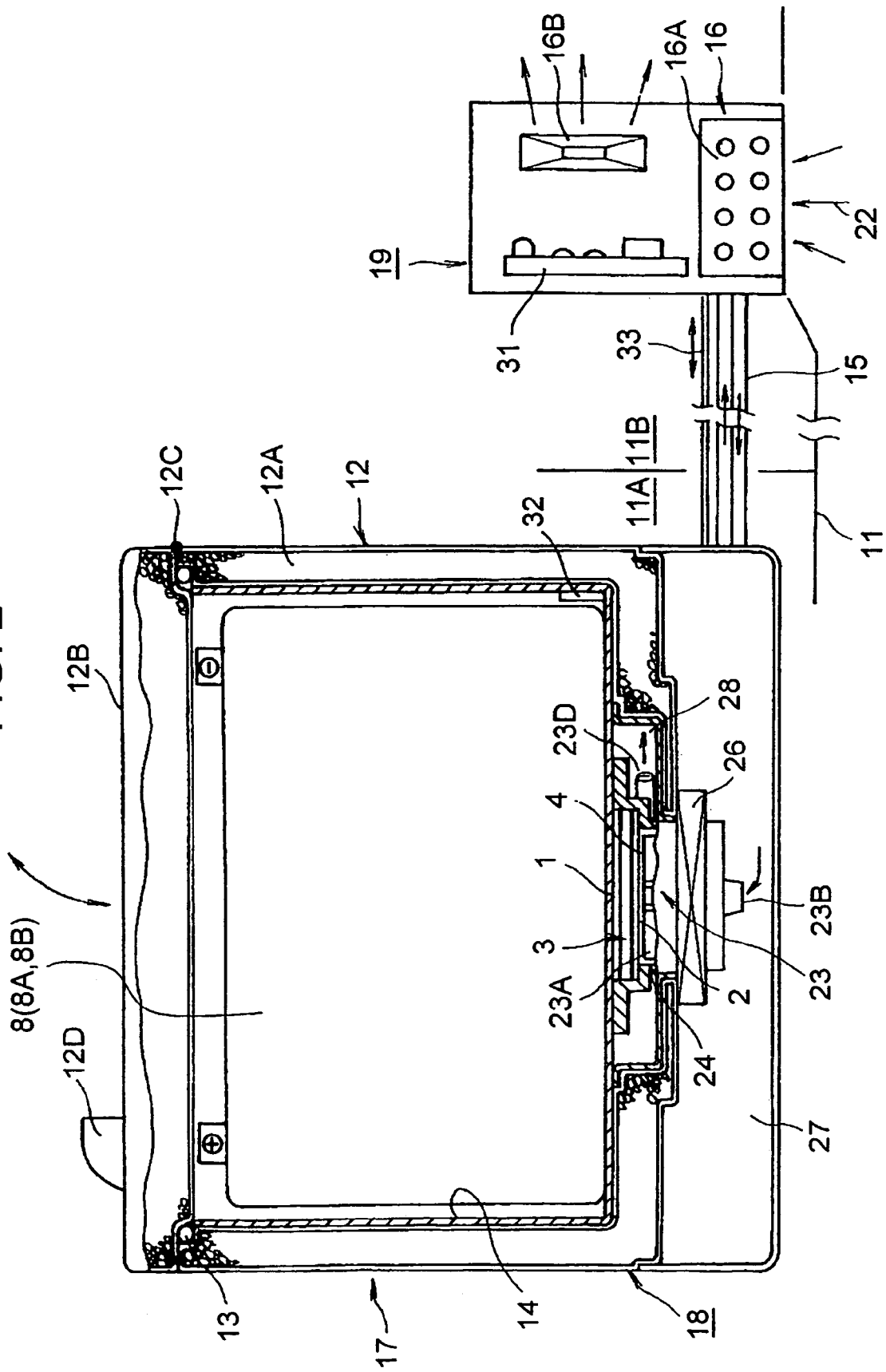
FIG. 2 is a sectional view of a temperature regulator of a storage battery in accordance with a first exemplary embodiment of the present invention.

Next, a housing that accommodates a thermoelectric transducer and the storage batteries related to the temperature regulator in accordance with the first embodiment is demonstrated hereinafter. As shown in FIG. 2, battery 8 is housed in housing 12, so that heat-flow between battery 8 and surroundings is restricted. Heat-flow due to the temperature regulation is realized in a predetermined path which runs through a section thermally coupled between thermoelectric transducer 3 and first face 1. A temperature of battery 8 can thus be regulated as per instruction without being affected by the surroundings. Unnecessary heat-travel to/from the surroundings and troubles due to this unnecessary heat-flow can be prevented. In this sense, housing 12 is preferably made of heat insulating material such as a panel or a sheet in which foamed resin, glass-wool, or another heat insulating material is filled, or a vacuum panel or a vacuum sheet. Housing 12 preferably accommodates the batteries in a replaceable manner, so that housing 12 can be used repeatedly. Housing 12 preferably has a structure suitable for battery 8 to be thermally coupled with first face 1 of transducer 3.

Based on the preferred structure discussed above, housing 12 comprises hard case 12A and lid 12B which opens or closes hard case 12A. Lid 12B is hinged to a border of case 12A with hinge 12C so that lid 12B can rotate on hinge 12C for opening/closing hard case 12A. Handle 12D is provided to lid 12B for opening/closing. Sealing member 13 is provided between case 12A and lid 12B, so that heat is prevented from traveling from case 12A to the outside and vice versa. In order to positively seal case 12A, means for locking lid 12B is preferably prepared; however, a method of opening/closing case 12A is not limited to the method discussed above, and lid 12B can be detachable.

Next, the thermal coupling of the storage battery with the thermoelectric transducer of the temperature regulator in accordance with the first embodiment is demonstrated. First face 1 of transducer 3 is mounted on a bottom of case 12A with face 1 facing upward, so that an accommodation of battery 8 into case 12A thermally couples battery 8 with first face 1 of transducer 3. In this case, both the elements directly couple with each other. However, as shown in FIG. 1, metal plate 14 made of good conductive material such as copper or aluminum is brought into contact with the surface of battery 8, so that both the elements are thermally coupled via metal plate 14. Metal plate 14 is provided along an inner wall of case 12A, and the accommodation of battery 8 brings a lower face of battery 8 into contact with metal plate 14. Some clearance is provided around battery 8 for replacing battery 8 with ease. This structure allows first face 1 to efficiently move the heat to a spacious face of battery 8 although face 1 is smaller than the surface area of battery 8, so that efficiency of cooling down or warming up increases. Metal plate 14 that surrounds battery 8 with some clearance accelerates heat-flow between first face 1 of transducer 3 and battery 8. If the clearance is eliminated, the efficiency of cooling down or warming up further increases. Therefore, enough free space is provided between an upper portion of surrounding wall made of metal plate 14 and battery 8 for accommodating battery 8 with ease into case 12A, and the lower portion of the surrounding wall closely faces to or even contacts with battery 8. This structure allows both efficient heat-flow and practicality to be compatible with each other.

Case 12A can have an opening in any direction for accommodating battery 8, and transducer 3 can be mounted on any place such as a side of housing 12. The opening can be provided to lid 12B.

First face 1 can be thermally coupled with battery 8 via fluid circulating on the surface area of battery 8. In this case, thermal action can be extended to not only the surroundings of battery 8 but also details such as a heat-exchange path, so that heat-exchange efficiency advantageously increases.

The thermal action accelerating medium of the temperature regulator in accordance with the first embodiment is detailed hereinafter.

Thermal action accelerating medium 4 is made of fluid such as brine or water. Since medium 4 is fluid, a path for thermal coupling between medium 4 and second face 2 can be arbitrarily designed, and the thermal coupling can be achieved with ease. As shown in FIG. 2, fluid medium 4 circulates in circulating path 15, so that medium 4 can be recycled. Water, or brine in particular, is suitable for medium 4 because of a heat-flow efficiency. Temperature regulating section 16 is provided in circulating path 15, for instance, for regulating a temperature of medium 4, thereby further accelerating thermal action and enhancing temperature regulating capacity of thermoelectric transducer 3.

A sub unit of the temperature regulator in accordance with the first embodiment is demonstrated hereinafter. As shown in FIG. 2, main unit 18 includes transducer 3 and storage battery compartment 17 where battery 8 is placed, and sub unit 19 includes temperature regulating section 16. Regulating section 16 exchanges heat with the open air using heat exchanger 16A and fan 16B. This structure saves a special thermal medium for this heat exchange, and the heat can be forcibly and efficiently exchanged by fan 16B. Ambient air 22 can be taken in automatically due to the car's running and discharged via heat exchanger 16A. However, when fan 16B is employed, the heat is exchanged within a car space closed to the outside, so that dust or exhaust gas advantageously does not enter into the car from the outside.

In sub unit 19, control board 31 is provided for regulating a temperature of battery 8. This structure allows control board 31 to control the power fed to transducer 3 and the driving of fan 16B, based on temperature information from sensor 32 detecting a temperature of battery 8, so as to maintain the temperature of battery 8 within a predetermined range. For this control, main unit 18 is coupled with sub unit 19 via wiring 33 including a power feeding circuit (not shown) for feeding and transmitting or receiving signals. As shown in FIG. 1, switch 35 is provided in the feeding circuit for transducer 3 in order to change over an exciting polarity, and control board 31 controls the change-over.

Figure 3:
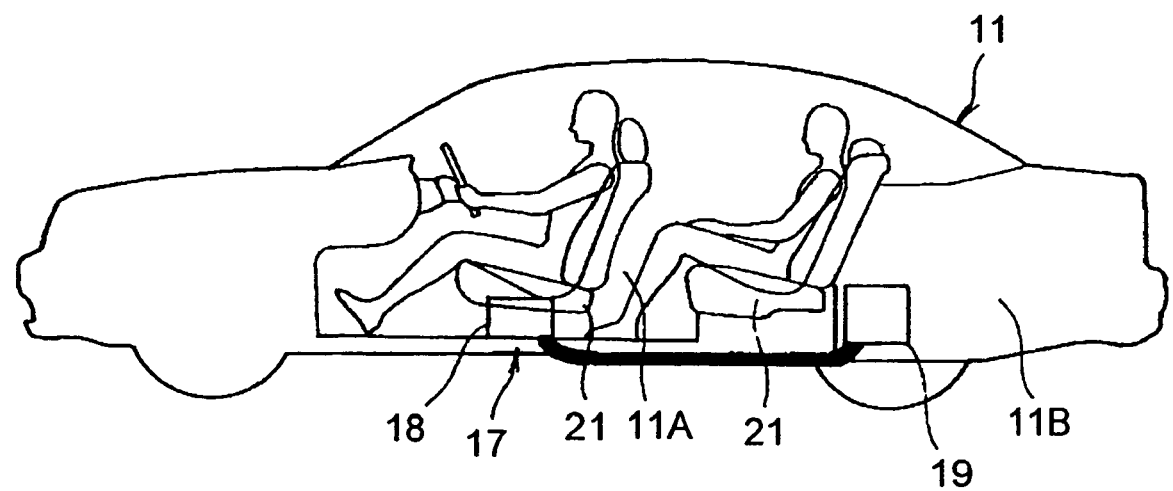
FIG. 3 is a perspective view of the regulator, shown in FIG. 2, installed in a car.

A placement of the main unit and the sub unit in the temperature regulator in accordance with the first embodiment is described hereinafter. As shown in FIG. 3, main unit 18 is disposed in a cabin 11A of car 11, and sub unit 19 is disposed in trunk (or boot) 11B. Main unit 18 is preferably disposed under seat 21, where dead space is available, and sub unit 19 is preferably disposed at an inner-upper portion or an inner-lower portion of the trunk so as not to block baggage from being loaded. Separation of main unit 18 from sub unit 19 allows both the units to share dead spaces available in car 11. Another way to place both the units is to place main unit 18 out of the way, and to place sub unit 19 at a place convenient for in-taking and discharging ambient air. Both of the units can be disposed in the cabin, with one unit being placed under front seat 21 and the other unit being placed under rear seat 21. Both of the units can be disposed in the trunk, and placed out of the way as well as at places convenient for in-taking and discharging ambient air.

A pump of the temperature regulator in accordance with the first embodiment is demonstrated hereinafter. As shown in FIG. 1 and FIG. 2, pump 23 forcibly circulates thermal-action accelerating medium 4 between temperature regulating section 16 and thermally-coupled section on second face 2. This structure allows transducer 3 and temperature regulating section 16 to be placed at any location. In other words, both the elements can be separated from each other as far as possible, or placed in any positional relation. Pump 23, in particular, is placed at the thermally-coupled section on second face 2, and blades 23A are disposed in pump-room 24 where second face 2 is exposed as shown in FIG. 1. This structure forcibly moves medium 4 on second face 2, thereby accelerating heat-flow, thus the thermal action on face 2 is further accelerated, which further enhances the temperature regulating capacity on first face 1 with respect to battery 8.

Blades 23A are rotatably supported by shaft 25, made of e.g., stainless steel, of bearing 23C disposed at the center of intake port 23B behind pump-room 24. Magnet 23E is buried in blades 23A, and stator 26 disposed on an outer wall makes blade 23A spin. An opening of intake port 23B is placed in intake room 27 added to case 12A. An opening of outlet port 23D projected from a part of the outer wall of pump room 24 is placed in outlet room 28. Intake room 27, outlet room 28, intake port 23B and outlet port 23D are connected to heat exchanger 16A of temperature regulating section 16 and circular path 15 having a going route and a returning route. This structure allows medium 4, of which temperature has been regulated by regulating section 16, to be supplied repeatedly to the thermally coupled section on second face 2, thereby accelerating thermal action of face 2.

Heat exchange in the sub unit of the temperature regulator in accordance with the first embodiment is demonstrated hereinafter. When a temperature of medium 4 is regulated in heat exchanger 16A, the heat can be exchanged with conditioned air or non-conditioned air. The conditioned air in particular advantageously accelerates the thermal action of second face 2 due to its conditioned characteristics. In this case, temperature regulating section 16 is preferably placed in cabin 11A where the conditioned air is discharged. For instance, when a blowing path of the conditioned air is provided for temperature regulating section 16, it is unnecessary to provide a long path.

The temperature regulator of the storage batteries prolongs a service life of the storage batteries mounted in various electric cars and hybrid cars. In the case of the hybrid car, the regulator increases a ratio of battery-running vs. gasoline-running. If an air conditioner employing a compressor driven by a motor is mounted in those cars, the number of motor-driven items increases, which is good for the environment. When a car stops at an intersection, the engine is turned off for environmental protection, so that the air conditioner is also turned off automatically. However, employing a motor-driven compressor can avoid this inconvenience.

Exemplary Embodiment 2

Figure 4:
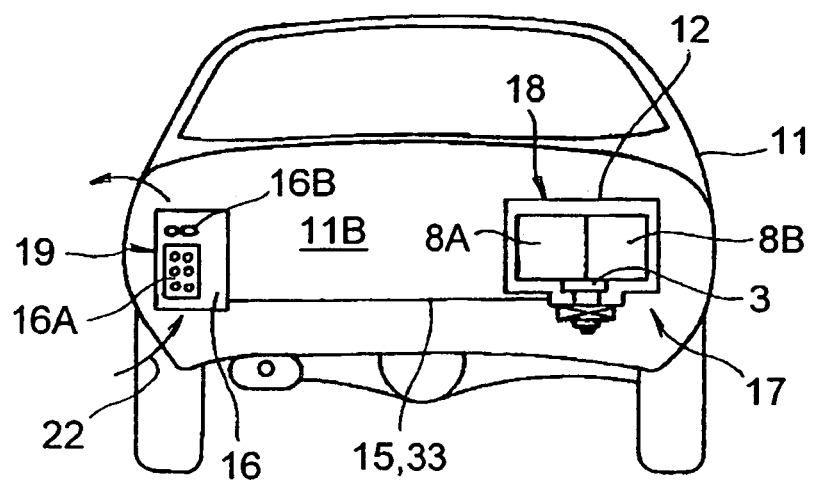
FIG. 4 is a perspective rear view of a car where the regulator in accordance with a second embodiment of the present invention is installed.

In the second embodiment illustrated in FIG. 4, main unit 18 and sub unit 19 similar to those in the first embodiment illustrated in FIG. 1 through FIG. 3 are placed in trunk 11B of car 11 at an inner right-end and an inner left-end respectively. These places hardly block baggage from being loaded. Since sub unit 19 is placed near to a side face of the car body, the intake port and discharge port are provided on the side face of car 11. Thus ambient air is taken into temperature regulating section 16 and supplied to heat exchanger 16A for exchanging heat. This structure allows temperature regulating section 16 to use fresh ambient air and increase a regulating efficiency compared with a case where the air in trunk 11B is repeatedly used.

Exemplary Embodiment 3

Figure 5:
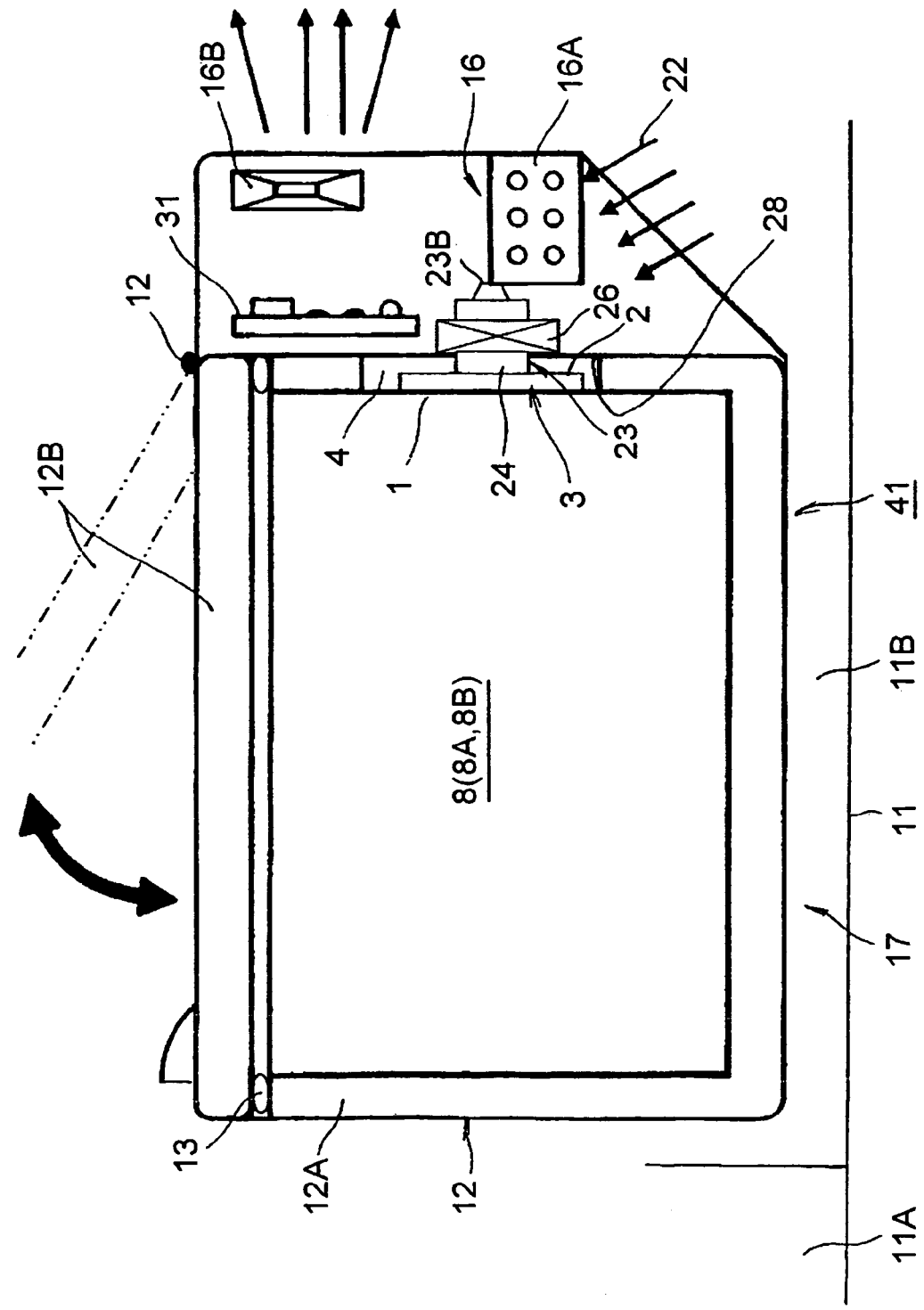
FIG. 5 is a sectional view of a temperature regulator in accordance with a third embodiment of the present invention.
Figure 6:
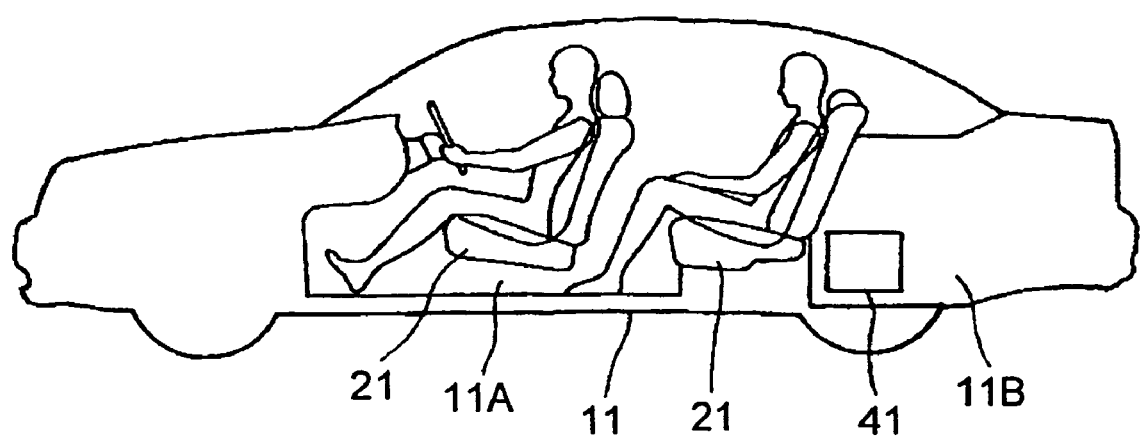
FIG. 6 is a perspective view of the regulator, shown in FIG. 5, installed in a car.

In the third embodiment illustrated in FIG. 5 and FIG. 6, storage battery compartment 17, where storage batteries 8 are placed, thermoelectric transducer 3 and temperature regulating section 16 are integrated into one unit, namely, temperature regulating unit 41. This structure does not permit the distributed placement discussed in the previous embodiments; however, it advantageously saves circular path 15 and wiring 33 which connect between the units, because all elements are integrated into one unit. In addition, parts of the same wall can be utilized for dual purposes, which lowers the cost. This structure is particularly suitable for a car having a dead space that can accommodate unit 41. In FIG. 6, temperature regulating unit 41 is mounted in trunk 11B; however, it can be mounted in cabin 11A.

Exemplary Embodiment 4

Figure 7:
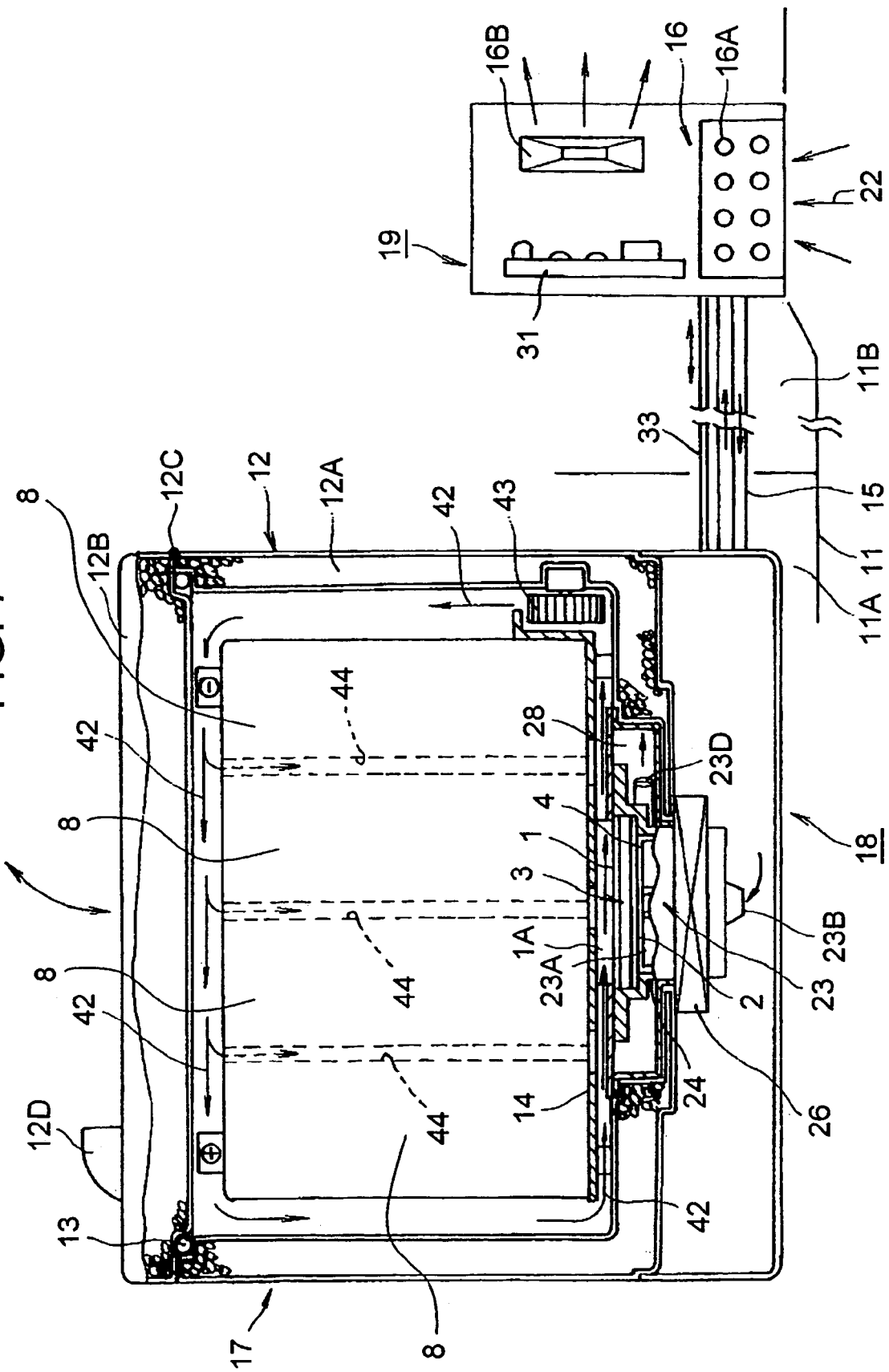
FIG. 7 is a sectional view of a temperature regulator of a storage battery in accordance with a fourth embodiment.
Figure 8:
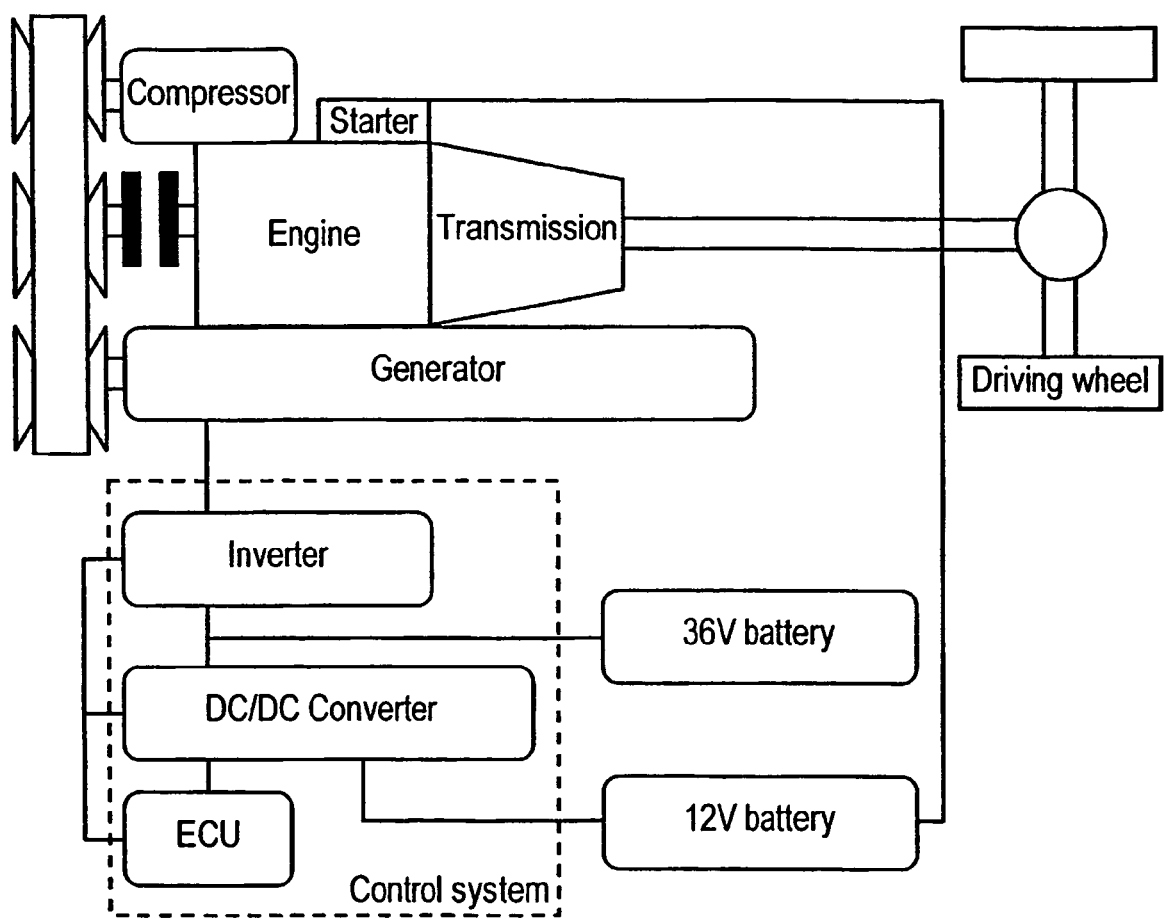
FIG. 8 is a block diagram showing a driving system and a control system of a hybrid car.

In the fourth embodiment illustrated in FIG. 7, first face 1 of thermoelectric transducer 3 is thermally coupled with storage battery 8 via fluid thermal medium 42 flowing on the surfaces of these two elements. Thermal medium 42 can be air, water, or brine similar to thermal action accelerating medium 4 demonstrated in the first embodiment. Among them, brine is preferable in consideration of thermal efficiency. In the case of such a thermal-coupling using fluid, heat can be transferred even at details on the surfaces of battery 8, so that an efficiency of heat-flow increases when battery 8 is cooled down or warmed up. Thus thermal medium 42 such as air or water can be circulated by fan 43 shown in FIG. 7 or a pump between case 12A and battery 8, thereby further increasing the heat-flow efficiency between first face 1 and battery 8. In this case, thermal medium flowing path 44 is preferably provided to battery 8 as shown in FIG. 7. Fin 1A is preferably formed on first face 1 of thermoelectric transducer 3 because fin 1A accelerates the heat flow to/from thermal medium 42. When battery 8 includes a plurality of batteries, thermal medium flowing path 44 is preferably disposed between the respective batteries.

In all the previous embodiments discussed above, a Peltier element is used as a thermoelectric transducer. However, other elements, having the characteristics discussed previously, such as a thermoelectric element including a thermoelectronic chip can be used as the transducer. A use of one of those elements to regulate a temperature of one or plural storage batteries is within the scope of the present invention.

In all the previous embodiments discussed above, the temperature regulator of a storage battery is mounted in an electric car or a hybrid car. The storage battery can be a lead-acid storage battery, a nickel cadmium battery, a nickel metal hybrid battery, or a lithium-ion battery. The electric car and hybrid car comprise (a) a driving system including a generator, an engine and a transmission and (b) a control system including an inverter, a converter and an ECU for driving the drive-wheels. Those cars also include a steering system for controlling a running direction. These systems are mounted and integrated in the car. The present invention, however, is not limited to the previous embodiments, and the temperature regulator is applicable to a stand-alone storage battery, e.g., a power supply for load leveling and other kinds of power supplies such as a fuel battery where heat involves problems.

INDUSTRIAL APPLICABILITY

In a temperature regulator of the present invention, a thermoelectric transducer does two jobs contradictory to each other, i.e., its first face dissipates heat and its second face absorbs heat, responsive to a polarity in exciting the battery. Thus the battery and a thermal action accelerating medium, with both the elements being thermally coupled, are forcibly warmed up or cooled down. When a polarity is set for the first face to absorb heat, the first face forcibly cools down the battery thermally coupled with the first face so that a temperature of the battery does not exceed a predetermined temperature. The second face is accelerated to dissipate heat between the second face and the thermal action accelerating medium that is thermally coupled with the second face, thereby increasing a cooling capacity of the first face with respect to the battery. This structure can cool down the battery more efficiently and sufficiently than a conventional air cooling method. The ratio of battery-running vs. gasoline-running of a hybrid car thus increases, and yet, a service life of the battery can be prolonged.

On the other hand, when the polarity is set for the first face to dissipate heat, the temperature of the battery is regulated by forcibly warming up the battery so that the temperature will not fall lower than a predetermined temperature. The second face is accelerated to absorb heat between the second face and the thermal action accelerating medium, thereby increasing warming capacity of the first face with respect to the battery. The battery is thus warmed up efficiently. Thus the thermal electric transducer prevents the battery from degrading its performance in a low temperature environment and allows the battery to keep being used.

The temperature regulator of the present invention is advantageously applicable to an electric car and a hybrid car.

The invention claimed is:

1. A temperature regulator for regulating temperature of a storage battery, said temperature regulator comprising:
    a thermoelectric transducer having a first face and a second face, said thermoelectric transducer being arranged to selectively provide one of heat dissipation and heat absorption via said first and second faces, respectively, and heat dissipation and heat absorption via said second and first faces, respectively;
    a storage battery holding member arranged to hold the storage battery at a storage battery location; and
    a thermal action accelerating fluid flow room containing a thermal action accelerating fluid thermally coupled with said second face of said thermoelectric transducer, said thermal action accelerating fluid including either of brine and water;
    wherein said first face of said thermoelectric transducer is arranged relative to said storage battery holding member so as to be thermally coupled with the storage battery when the storage battery is held in the storage battery location.

2. The temperature regulator of claim 1, wherein said temperature regulator is mounted in a vehicle.

3. The temperature regulator of claim 1, wherein said storage battery holding member comprises a housing for covering the storage battery.

4. The temperature regulator of claim 1, wherein
said housing is made of heat insulating material.

5. The temperature regulator of claim 1, wherein
said thermoelectric transducer is arranged relative to said storage battery holding member so that the storage battery is directly contacted with said first face of said thermoelectric transducer when said storage battery is held in the storage battery location by said storage battery holding member.

6. The temperature regulator of claim 1, wherein
said thermoelectric transducer is arranged relative to said storage battery holding member so that the storage battery is thermally coupled with said first face of said thermoelectric transducer via a heat conductive member arranged to be disposed on a surface of the storage battery when the storage battery is held in the storage battery position by said storage battery holding member.

7. The temperature regulator of claim 1, wherein
said thermoelectric transducer is arranged relative to said storage battery holding member so that the storage battery is thermally coupled with said first face of said thermoelectric transducer via fluid that circulates on a surface of the storage battery when the storage battery is held in the storage battery location by said storage battery holding member.

8. The temperature regulator of claim 1, further comprising
a temperature regulating section for regulating a temperature of said thermal action accelerating fluid.

9. The temperature regulator of claim 8, further comprising
a pump for pumping said thermal action accelerating fluid through said thermal action accelerating fluid passage such that thermal action accelerating fluid circulates between said temperature regulating section and said second face of said thermoelectric transducer.

10. The temperature regulator of claim 9, wherein
said pump is disposed at a thermally-coupled section on said second face of said thermoelectric, and said pump includes a blade disposed in said thermal action accelerating fluid flow room in which said second face is exposed.

11. The temperature regulator of claim 8, wherein
said temperature regulating section is operable to effect heat-exchange between said thermal action accelerating fluid and ambient air.

12. The temperature regulator of claim 8, wherein
said thermoelectric transducer and said temperature regulating section are integrated into a temperature regulating unit.

13. The temperature regulator of claim 12, wherein
said temperature regulating unit is disposed in one of a cabin and a trunk of a vehicle.

14. The temperature regulator of claim 8, wherein
said thermoelectric transducer and said temperature regulating section are included in different units respectively.

15. The temperature regulator of claim 14, wherein
a unit including said thermoelectric transducer and another unit including said temperature regulating section are disposed in a cabin and a trunk of a vehicle respectively.

16. The temperature regulator of claim 14, wherein
a unit including said thermoelectric transducer and another unit including said temperature regulating section are disposed together in one of a cabin and a trunk of a vehicle.

17. The temperature regulator of claim 1, further comprising
the storage battery, wherein said storage battery comprises one of a lead-acid battery, a nickel cadmium battery, a nickel zinc battery, a nickel metal hydride battery, and a lithium-ion battery.

18. The temperature regulator of claim 1, further comprising
a switch operably coupled to said thermoelectric transducer for switching said thermoelectric transducer between providing heat dissipation and heat absorption via said first and second faces, respectively, sand providing heat dissipation and heat absorption via said second and first faces, respectively, by changing over an excitation polarity of said thermoelectric transducer.

19. A vehicle comprising:
a storage battery;
a motor arranged to be driven by said storage battery; and
a temperature regulator comprising a thermoelectric transducer having a first face and a second face, said thermoelectric transducer being arranged to selectively provide one of heat dissipation and heat absorption via said first and second faces, respectively, and heat dissipation and heat absorption via said second and first faces, respectively;
a storage battery holding member arranged to hold the storage battery at a storage battery location; and
a thermal action accelerating fluid flow room containing a thermal action accelerating fluid thermally coupled with said second face of said thermoelectric transducer, said thermal action accelerating fluid including either of brine and water;
wherein said first face of said thermoelectric transducer is arranged relative to said storage battery holding member so as to be thermally coupled with the storage battery when the storage battery is held in the storage battery location.

20. The vehicle of claim 19, further comprising
an engine to be used with said motor.

21. The vehicle of claim 19, further comprising
an air conditioner employing a compressor to be driven by said motor.

22. A temperature regulating arrangement comprising:
a thermoelectric transducer having a first face and a second face, said thermoelectric transducer being arranged to selectively provide one of heat dissipation and heat absorption via said first and second faces, respectively, and heat dissipation and heat absorption via said second and first faces, respectively;
a storage battery holding member;
a storage battery held by said storage battery holding member at a storage battery location;
a thermal action accelerating fluid flow room containing a thermal action accelerating fluid thermally coupled with said second face of said thermoelectric transducer, said thermal action accelerating fluid including either of brine and water;

wherein said first face of said thermoelectric transducer is arranged relative to said storage battery holding member so as to be thermally coupled with said storage battery held by said storage battery holding member.

23. The temperature regulating arrangement of claim 22, wherein said first face of said thermoelectric transducer is directly contacted with said storage battery.

24. The temperature regulating arrangement of claim 22, wherein said first face of said thermoelectric transducer is thermally coupled with said storage battery via a heat conductive member disposed on a surface of said storage battery.

25. The temperature regulating arrangement of claim 24, wherein said first face of said thermoelectric transducer is thermally coupled with said storage battery via fluid circulating on a surface of said storage battery.

* * * * *